United States Patent [19]

Hamlin

[11] 4,270,746

[45] Jun. 2, 1981

[54] SHEET SEPARATOR

[75] Inventor: Thomas J. Hamlin, Macedon, N.Y.

[73] Assignee: Xerox Corporation, Stamford, Conn.

[21] Appl. No.: 81,497

[22] Filed: Oct. 3, 1979

[51] Int. Cl.³ .......................... B65H 1/06; B65H 3/12
[52] U.S. Cl. .................................... 271/98; 271/3.1;
271/20; 271/35; 271/106; 271/166
[58] Field of Search ................. 271/3.1, 5, 11, 20,
271/35, 90, 94, 98, 99, 104–106, 112, 132, 133,
161, 165–167, 276

[56] References Cited

U.S. PATENT DOCUMENTS

| | | | |
|---|---|---|---|
| 2,812,178 | 11/1957 | Hagren | 271/104 X |
| 2,817,519 | 12/1957 | Beck | 271/94 |
| 2,979,329 | 4/1961 | Cunningham | 271/98 |
| 3,086,771 | 4/1963 | Goin et al. | 271/94 X |
| 3,424,453 | 1/1969 | Halbert | 271/35 |

FOREIGN PATENT DOCUMENTS 435327 10/1967 Switzerland ................. 271/99

*Primary Examiner*—Robert W. Saifer

[57] ABSTRACT

An automatic document handler adapted to receive a stack of documents to be copied for feeding the documents seriatim to the platen of a copy machine and returning the copied documents to the stack. A combination vacuum-document separator in conjunction with a precisely located air knife in relation to the vacuum belts and a document tray having a "U" shaped pocket therein is provided to assure positive feeding of each document to the platen without misfeeds or multifeeds.

1 Claim, 5 Drawing Figures

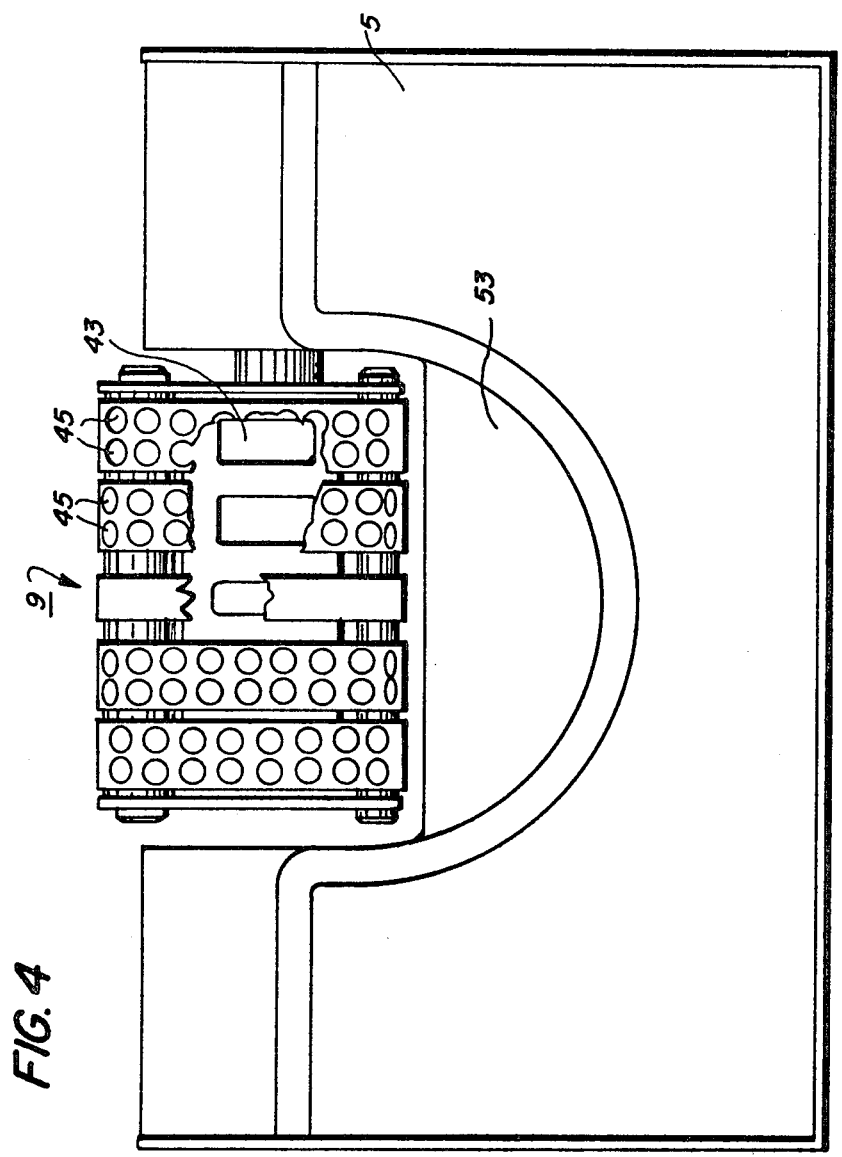

SHEET SEPARATOR

BACKGROUND OF THE INVENTION

With the advent of high speed xerographic copy reproduction machines wherein copies can be produced at a rate in excess of three thousand copies per hour, the need for a document handler to feed documents to the copy platen of the machine in a rapid, dependable matter was recognized to enable full utilization of the reproduction machines potential copy output. A number of document handlers are currently available to fill that need. These document handlers must operate flawlessly to virtually eliminate the risk of damaging the originals and generate minimum machine shutdowns due to uncorrectable misfeeds or document multifeeds. It is in the initial separation of the individual documents from the document stack where the greatest number of problems occur.

Since the documents must be handled gently but positively to assure separation without damage through a number of cycles, a number of separators have been suggested such as friction rolls or belts used for fairly positive document feeding in conjunction with a retard belt, pad, or roll to prevent multifeeds. Vacuum separators such as sniffer tubes, rocker type vacuum rolls, or vacuum feed belts have also been utilized.

While the friction roll-retard systems are very positive, the action of the retard member, if it acts upon the printed face can cause smearing or partial erasure of the printed material on the document. With single sided documents, this does not present a problem as the separator can be designed so that the retard mechanism acts upon the underside of the document. However, with documents printed on both sides, there is no way to avoid the problem. Additionally, the reliable operation of friction retard feeders is highly dependent on the relative frictional properties of the paper being handled. This cannot be controlled in a document feeder.

These problems are aggravated when an attempt is made to feed sheets from the bottom of the stack. However, in may instances it is desirable to provide a bottom feeder to allow restacking of sheets while the feeder is operating or to replenish the sheet supply without shutting off the feeder.

With bottom sheet feeders, since the stack height is variable, the normal force on the bottom sheet, pressing the stack against the bottom sheet and pressing the bottom sheet against the stack tray is variable. To overcome or reduce these forces, air floatation of the stack by providing a perforated tray with positive pressure air supplied thereto or by providing riffle jets at the edges of the stack to inject air between the sheets near the bottom of the stack has been found effective.

It is the object of this invention to provide an improved bottom vacuum feeder.

SUMMARY OF THE INVENTION

A sheet feeder for separating and feeding the bottom sheet in a sheet stack the feeder including a stack tray having a pocket formed therein and a vaccum feed belt assembly positioned in the pocket below the surface of the tray. An air knife is provided to produce a plurality of air streams directed at approximately a 21° angle downwardly toward the lead edge of the bottom sheet, the knife being located relative to the lead edge of the sheet stack and the vacuum feed belt assembly to provide optimum performance irrespective of curl encountered in the sheets being fed.

BRIEF DESCRIPTION OF THE DRAWINGS

FIG. 4 is a top view of the document tray and feed belts of the document handler illustrated in FIG. 1.

DESCRIPTION OF THE PREFERRED EMBODIMENT

Figure 1:
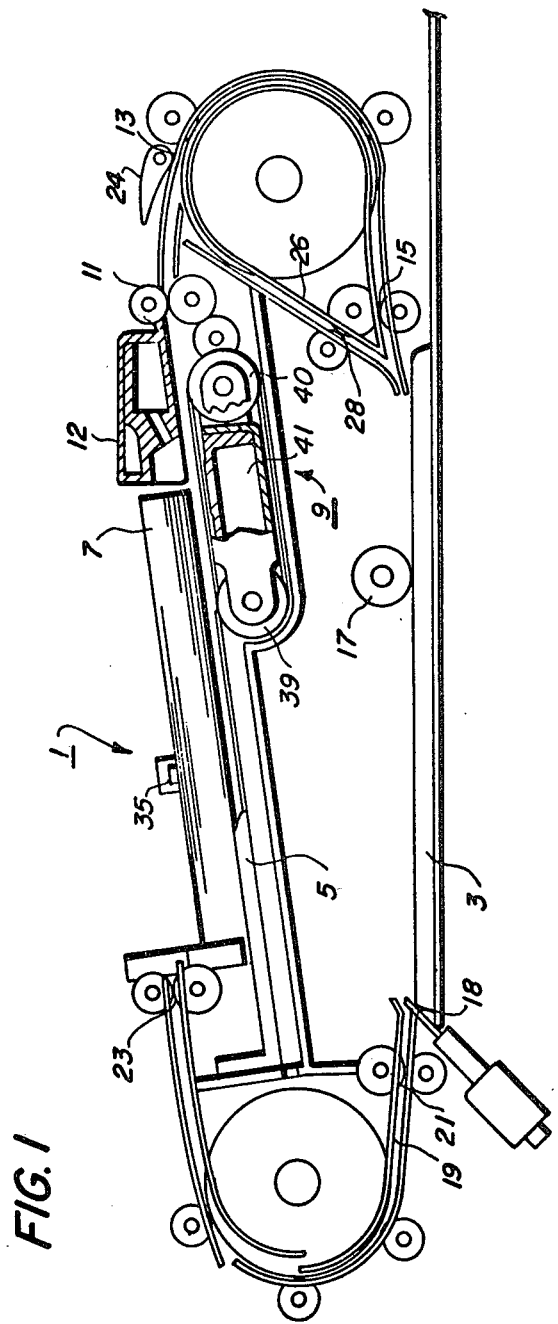
FIG. 1 is a cross-sectional view of an exemplary document handler employing the sheet separator-feeder of the present invention.

Referring to the drawings, there is illustrated an automatic document handler 1 for installation above the exposure platen 3 of a xerographic reproduction machine. The document handler is provided with a document tray 5 to be explained more fully hereinafter, adapted for supporting a stack of documents 7 face up. A vacuum belt-corrugating feeder mechanism 9 is located below the document tray for acquiring and corrugating the bottom document in the stack and forwarding the document to take away roll pair 11 after an air knife 12 has had time to separate sheet 1 from the rest of the stack. The document is then fed by take-away roll pair 11 through document quide 13 to feed-roll pair 15 and under platen roll 17 onto the platen of the copy machine for reproduction. A retractable registration edge 18 is provided to register the document fed onto the platen. Following exposure of the document, the edge is retracted by suitable means such as a solenoid and the document is fed off the platen by roll 17 into guide 19 and feed-roll pair 21 back to the document stack through the feed-roll pair 23. In the event it is desired to present the opposite side of a document for exposure, the document is fed from the stack through guide 13 until the trail edge passes document divertor 24. Document divertor is then rotated counterclockwise to block the portion of guide 13 between divertor 24 and feed roll pair 11. The document direction is reversed and the document is diverted through guides 26 and feed-roll pair 28 onto the platen 3.

The document handler is also provided with a sheet separator finger 35 as is well known in the art to separate the documents to be fed from those documents returned to the document handler. Upon removal of the last document from beneath sheet separator finger 35, the finger 35 drops through a slot provided in the tray, suitable sensors are provided to sense that the last document in the set has been removed from the tray and the finger is then rotated in a clockwise direction to again come to rest on the top of the documents in the stack prior to subsequent recirculation of the document set.

Figure 2:
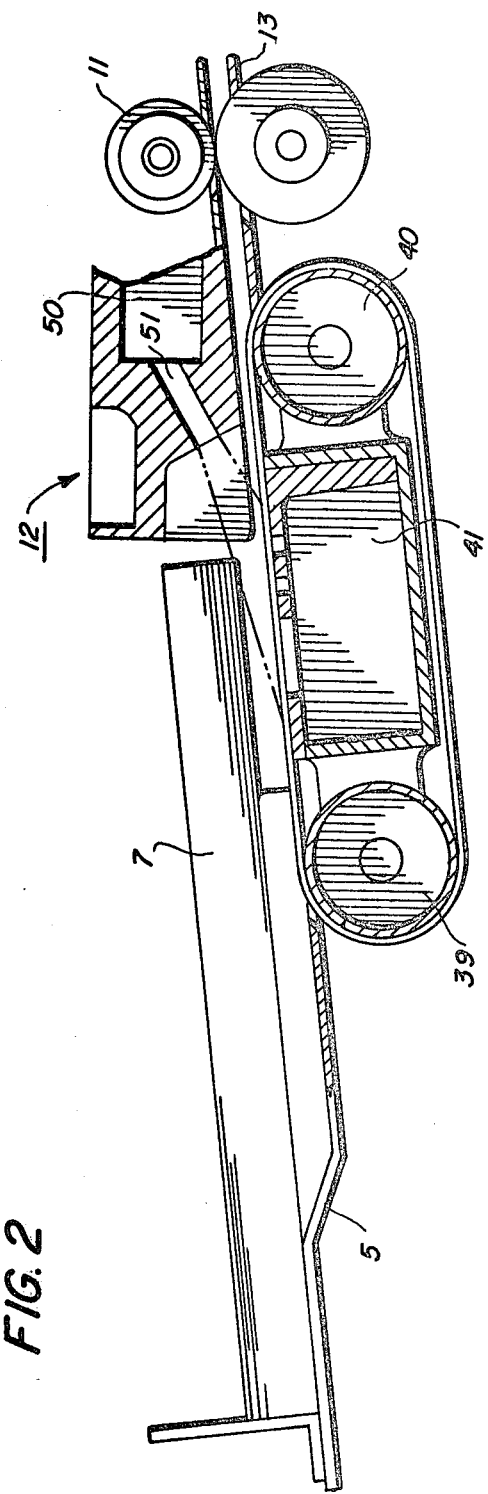
FIG. 2 is an enlarged, cross-sectional view of the feed belt assembly and air knife portion of the document handler of FIG. 1.
Figure 3:
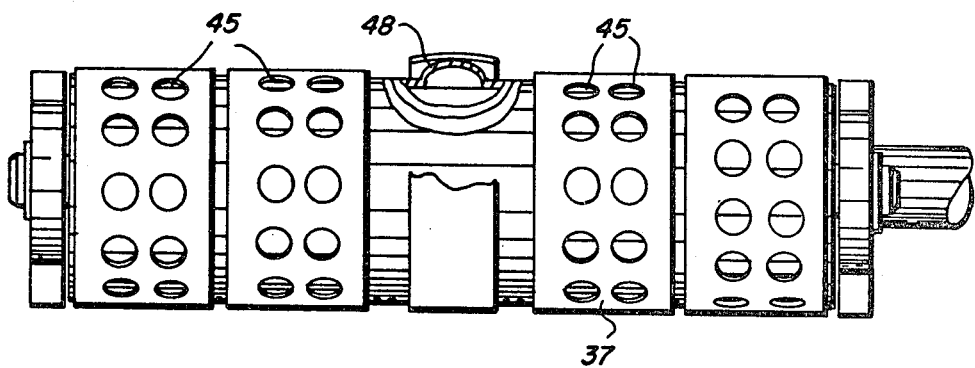
FIG. 3 is an end view, partially in section of the vacuum feed belts illustrated in FIG. 2.

Referring more particularly to FIGS. 2, 3 and 4 wherein the novel document separator-feeder is more clearly illustrated, there is disclosed a plurality of feed belts 37 supported for movement on feed belt rolls 39 and 40. Spaced within the run of the belts 37 there is provided a vacuum plenum 41 having openings 43 therein adapted for cooperation with perforations 45 in the belts 37 to provide a vacuum for pulling the bottom documents in the document stack onto the belts 37. As can be seen from FIG. 3, the plenum is provided with a raised portion 48 beneath the center belt run so that upon capture of the bottom document in the stack against belts 37, a center corrugation will be produced in the bottom sheet. For optimum performance, the raised portion should project above the plane of the remainder of the belts approximately 0.117 inches. Note also that the belts are below the surrounding support surfaces. Thus the document is corrugated into a double valley configuration. The flat surfaces of the vacuum belts on each side of the raised center belt generates a region of maximum stress in the document which varies with the document beam strength. In the unlikely event that more than one document is pulled down into contact with the feed belts, the beam strength of the second document resists the corrugating action, thus gaps are opened between sheets one and two which extend to their lead edges. These gaps and channels reduce the vacuum levels between sheets one and two due to porosity in sheet one and provide for entry of the separating air flow from the air knife 12.

Figure 5:
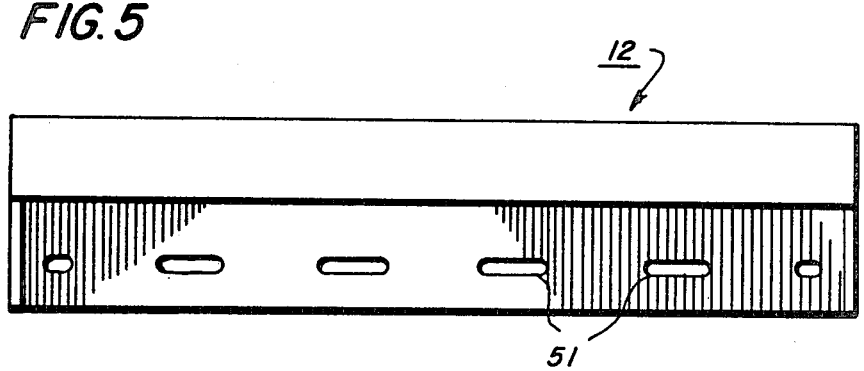
FIG. 5 is a partial perspective view of the discharge end of the air knife illustrating the air discharge orifices.

The air knife 12 is comprised of a pressurized air plenum 50 having a plurality of air jet openings 51 to inject air between the document pulled down against the feed belt and the documents thereabove to provide an air cushion or bearing between the stack and the bottom document to minimize the force necessary for removing the bottom document from the stack. It can be seen by reference to FIG. 5 that the air knife 12, is provided with a plurality of separated discharge orifices 51. The orifices on both edges have a diameter of approximately 0.20 inches while the central orifices are approximately 0.20 inches wide by approximately 0.472 inches long.

With the use of the air knife in conjunction with the bottom sheet corregator, if two documents are pulled down toward the belts 37, since the top sheet would not be corrugated, the air knife would inject air into the space between the two documents and force the second document off from the raised belt back toward the document stack.

As can be seen by reference to FIG. 2, the stack tray is designed such that the lead edge of the sheets in the stack are spaced a slight distance from the front edge of the tray. For optimum performance the air knife is located such that the center of the discharge orifices are located approximately 0.500 inches above the plane of the vacuum belts and approximately 0.950 inches in front of the lead edge of the sheets in the stack. Further, the air knife is canted such that the air streams are discharged at approximately at 21 degree angle to the plane of the surface of the belts. With this disclosed interrelationship between the vacuum feed belts, the lead edge of the stack of sheets and the air knife location and angular orientation, the document feeder is capable of reliably feeding sheets even when the sheets have an up curl of approximately 0.500 inches.

By suitable valving and controls, it is desirable to provide a delay between the time the vacuum is applied to pull the document onto the belts and the start up of the feed belts to assure that the bottom document is captured on the belt before belt movement commences and to allow time for the air knife to separate sheet 1 from any sheets that were pulled down with it.

By reference to FIGS. 1, 2 and 4 it can be seen that the document tray 5 is provided with a depressed portion or pocket 53 having a generally parabolic outline behind the feed belt assembly. This pocket serves a number of purposes. First, space is provided for the forward portion of the bottom document to be pulled down onto the feed belt assembly providing for formation of the two valley corrugation previously mentioned. Secondly, the vacuum is applied over the area of the pocket with an air seal between the bottom document provided by the parabolic edges of the pocket. The air seal maximizes the vacuum force over the whole area of the pocket thus helping to pull the bottom document onto the feed belt assembly. A third function of the parabolic pocket is to provide for a high pressure seal between sheet 1 and the remainder of the stack. This high pressure seal is achieved by supporting a major portion of the stack weight in the edge regions of the pocket. The seal serves to reliably convert the velocity energy of the air knife flow into a lifting pressure over the pocket area.

To further increase the efficiency of the system, the stack tray is provided with a rearward tilt as seen in FIGS. 1 and 2. When floatation air is provided under the stack or between the first and second sheets, gravity will allow the sheets to settle or float back against the rear tray wall. Thus, the sheet being removed is pulled uphill while gravity helps hold the remainder of the sheets back, helping to prevent multifeeds.

With this disclosed arrangement of pocket geometry, air knife and spaced, corrugating feed belt assembly, optimum document separation and feed can be obtained without the necessity for retard members or multiple sheet stops. Further the system is extremely gentle, and since the feed belts are not actuated until the document is firmly captured thereon, there is a minimal slippage between the document and the feed belts and therefore smear or document degradation is practically non-existent.

While I have described a preferred embodiment of my invention, it should be understood that the invention may be otherwise embodied within the scope of the following claims.

What is claimed is:

1. A bottom sheet separator-feeder for separating and forwarding sheets seriatim comprising;

a stack tray adapted for supporting a stack of sheets to be fed, said stack tray having a "U" shaped pocket formed therein;

a plurality of vacuum feed belts disposed in said pocket beneath said tray adapted to pull the bottom sheet in the stack into the pocket and feed the sheet from beneath the sheet stack;

a portion of the center belt of said vacuum feed belts being spaced approximately 0.117 inches above the remainder of said belts such that when the bottom sheet in the stack is forced into contact with said belts, a temporary corrugation is formed in the sheet; and, an air knife disposed at an angle of approximately 21° to the plane of said stack tray adjacent the front of said tray to inject air between the bottom sheet in the stack, said air knife having a plurality of spaced discharge orifices therein, said air knife being located relative to the front edge of the sheet stack such that the discharge orifices are spaced approximately 0.500 inches above the plane of the vacuum feed belts and approximately 0.950 inches from the lead edge of the sheet stack for optimum separation of the bottom sheet from the remainder of the sheets in the stack.

* * * * *